(No Model.) 3 Sheets—Sheet 1.
J. P. MILBOURNE.
IN AND OUT INDICATOR.
No. 563,501. Patented July 7, 1896.
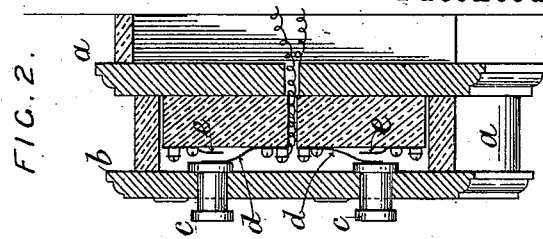
Witnesses
H. van Oldenweel
Otto Munk
Inventor
John Parker Milbourne
By Richardson
Attorneys (No Model.) 3 Sheets—Sheet 2.

J. P. MILBOURNE.
IN AND OUT INDICATOR.

No. 563,501. Patented July 7, 1896.

Witnesses
H. van Oldeneel
Otto Munk

Inventor
John Parker Milbourne
by Richardson
Attorneys

THE NORRIS PETERS CO., PHOTO-LITHO., WASHINGTON, D. C.

(No Model.)  3 Sheets—Sheet 3.

J. P. MILBOURNE.
IN AND OUT INDICATOR.

No. 563,501. Patented July 7, 1896.

Witnesses
H. van Oldenneel
E. A. Scott

Inventor
John Parker Milbourne
by Richardson
Attorneys

UNITED STATES PATENT OFFICE.

JOHN PARKER MILBOURNE, OF MONTON, ENGLAND.

IN AND OUT INDICATOR.

SPECIFICATION forming part of Letters Patent No. 563,501, dated July 7, 1896.

Application filed December 26, 1895. Serial No. 573,323. (No model.) Patented in England March 11, 1895, No. 5,097.

*To all whom it may concern:*

Be it known that I, JOHN PARKER MILBOURNE, electrical engineer, of 11 Brackley Road, Monton, near Manchester, in the county of Lancaster, England, have invented certain new and useful Improvements in and Relating to In and Out Indicators, (for which I have obtained Letters Patent in Great Britain, numbered 5,097, bearing date March 11, 1895,) of which the following is a specification.

My invention relates to an automatic indicator; and my object is to afford information to persons calling at offices or the like as to whether the individual they are seeking is in or out without having to mount the stairs or go far into the building for this purpose. I accomplish this object by having an indicating name-plate at or near the entrance of the building and connecting electrically or otherwise a hat-peg or an "in" and "out" indicator in each office to a press-button and disk or other signal indicating and representing the individual who uses the hat-peg, so that when a hat or coat is placed on the peg the disk indicates that the owner is in when the caller presses the button in order to ascertain this fact.

In order that my invention may be fully understood and readily carried into effect, I will describe the accompanying two sheets of drawings, reference being had to the letters marked thereon.

Figure 4:
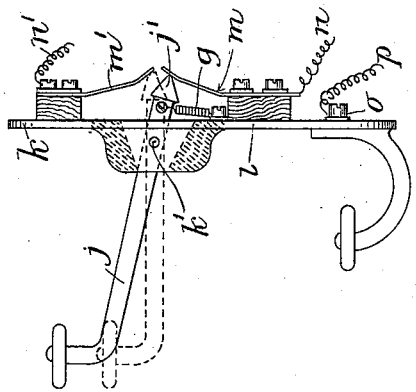
Figure 3:
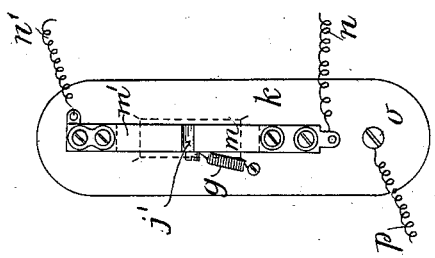
Figure 5:
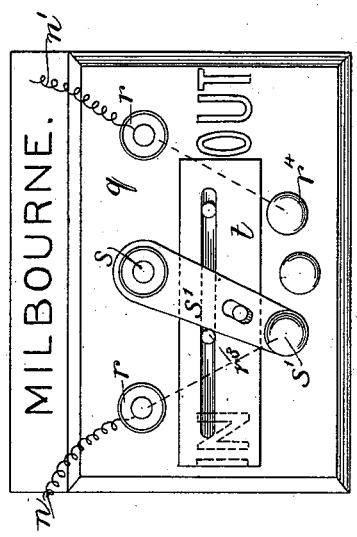

Figure 1 is a front view of an indicating name-plate with the cover partly removed; and Fig. 2 is a sectional side elevation taken on the line A A, Fig. 1. Figs. 3 and 4 represent a back view and side elevation, respectively, of a pivoted hat-peg; and Fig. 5 is a front elevation, and Fig. 6 an edge view, of a sliding name-indicator. Either the hat-peg or the sliding name-indicator can be used in connection with the name-plate shown in Figs. 1 and 2. Fig. 7 is a diagrammatic view of the circuit connections.

In Figs. 1 and 2, $a$ is the body, and $b$ the cover, of the name-plate; $c$, the press-buttons fitted in the cover, each button $c$ being held by two springs $d$ $d'$ out of contact with two spring contact-pieces $e$ $e'$ in the position indicated in Fig. 2. Secured to the body $a$ is an "in" and "out" dial $f$, and pivoted to the body is an electromagnetic needle $g$, placed between electromagnetic coils $h$ $h'$, of which the coil $h$ is connected by wires $i$ to the contact-pieces $e$, and the coil $h'$ is connected by wires $i'$ to the contact-pieces $e'$.

The hat-peg $j$ (see Figs. 3 and 4) is pivoted at $k'$ to a metal plate $k$, to which plate are secured two insulating-blocks $l$, on each of which is secured a metal spring-piece $m$ $m'$. The spring-piece $m$ is connected by a wire $n$ to the coil $h$ and the spring-piece $m'$ by a wire $n'$ to the coil $h'$. To a screw $o$ on the plate $k$ is attached a wire $p$ from a battery, (not shown,) which wire places the plate $k$ and hat-peg $j$ in an electric circuit. The hat-peg $j$ is held by a light spring $q$ normally in the position shown in full lines, Fig. 4, with the end $j'$ resting in contact with the lower spring-piece $m$, so that by pushing the corresponding button $c$ and closing the electric circuit to the electromagnetic coil $h$ by means of the spring contact-piece the name-indicator will show "out" if the peg is in the position shown in full lines in Fig. 4.

When the hat-peg is depressed by the weight of the owner's hat or coat thereon into the position indicated by dotted lines, Fig. 4, and its end $j'$ is brought into contact with the upper spring-piece $m'$, the other electric circuit to the magnetic coil $h$ will be closed when the button is pushed inward and the needle will be moved to indicate that the person is in.

Figure 6:
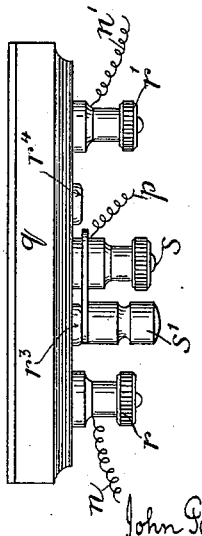
Figure 7:
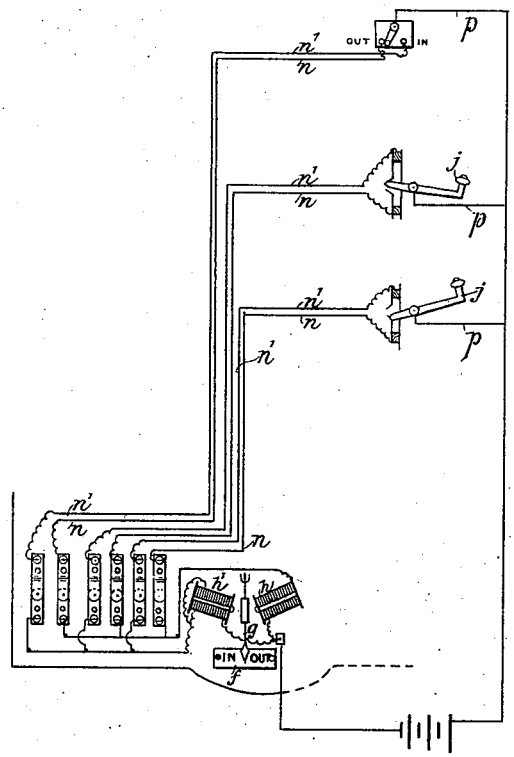

In Figs. 5 and 6, $q$ is the base-plate of the "in" and "out" indicator, which is placed in an office in place of the pivoted hat-peg and for the same purpose. To this indicator are secured two terminals $r$ $r'$, which are connected by wires (shown in dotted lines, Fig. 5) to two contact-studs $r^3$ $r^4$ on the plate $q$. Mounted on this plate is a stud $s$, on which is pivoted a spring contact-lever $s'$, and below this lever and connected to it by a stud $t'$ is a sliding plate $t$. The terminals $r$ $r'$ are connected by the wires $n$ $n'$, respectively, to the coils $h$ $h'$, while the stud $s$ is connected by a wire $p$ to a battery. (Not shown.) The lever $s'$ is shown with its end in contact with the contact-stud $r^3$, and when the corresponding button $c$ on the indicating name-plate is pushed the electric circuit between the terminal $r$ and the coil $h$ will be closed and the needle $g$ on the name-plate will indicate that the indicator in the office stands at "out."

When the occupant is in his office and moves the spring-lever $s'$ so as to bring it over the contact-stud $r^4$, the plate $t$ is moved to cover the word "out" and uncover "in" and the corresponding press-button $c$ is pushed and the circuit is closed between the contact-stud $r^4$, terminal $r'$, and coil $h'$, and the needle $g$ will move to "in," thus indicating that the occupant is in his office.

One feature of my invention is the combination and arrangement of parts whereby a single electromagnetic needle or other suitable indicator is made to serve for any number of names on an indicating-plate, the electric circuit being only closed and the battery in action during the time that a press-button or its equivalent is pressed inward to ascertain whether the owner of the corresponding hat-peg or name-indicator is in or out.

Having now particularly described and ascertained the nature of my said invention and in what manner the same is to be performed, I declare that what I claim, and desire to secure by Letters Patent of the United States, is—

1. In combination in an "in" and "out" indicator, a series of switch-levers, the "in" and "out" contacts, a single "in" and "out" indicator-lever, an armature carried thereby, an "in" electromagnet and an "out" electromagnet located on opposite sides of the indicator-lever, a series of pairs of push-buttons corresponding to the switch-levers, a battery and battery-wire connecting with the levers, an "in" and "out" branch lines connecting respectively with the "in" or the "out" contacts, the "in" or the "out" push-buttons, the "in" or "out" electromagnet and the battery-wire, substantially as described.

2. In combination in an "in" and "out" indicator for office use, a switch-lever in the office projecting from the wall to serve as a pivoted hat-peg, an "in" and "out" contact for the lever, "in" and "out" circuits leading from the switch-lever and contacts to the outside of the office, an indicator for said circuits including the electromagnets and the push-buttons for closing either circuit when the switch-lever is in connection with the contact thereof.

In witness whereof I have hereunto set my hand in presence of two witnesses.

JOHN PARKER MILBOURNE.

Witnesses:
   H. B. BARLOW,
   S. W. GILLETT.